US009859028B2

(12) United States Patent
Schuetz et al.

(10) Patent No.: US 9,859,028 B2
(45) Date of Patent: Jan. 2, 2018

(54) METHOD OF PRODUCING A FRESNEL ZONE PLATE FOR APPLICATIONS IN HIGH ENERGY RADIATION

(71) Applicant: Max-Planck-Gesellschaft zur Foerderung der Wissenschaften e.V., Munich (DE)

(72) Inventors: Gisela Schuetz, Wurmberg (DE); Corinne Grevent, Ostfildern (DE); Kahraman Keskinbora, Stuttgart (DE); Michael Hirscher, Stuttgart (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 327 days.

(21) Appl. No.: 14/383,505

(22) PCT Filed: Mar. 7, 2013

(86) PCT No.: PCT/US2013/054646
§ 371 (c)(1),
(2) Date: Sep. 5, 2014

(87) PCT Pub. No.: WO2013/132024
PCT Pub. Date: Sep. 12, 2013

(65) Prior Publication Data
US 2015/0022892 A1    Jan. 22, 2015

(30) Foreign Application Priority Data
Mar. 8, 2012    (EP) ................................. 12158669

(51) Int. Cl.
*G21K 1/06*    (2006.01)
*G02B 5/18*    (2006.01)

(52) U.S. Cl.
CPC ........... *G21K 1/067* (2013.01); *G02B 5/1857* (2013.01); *G02B 5/1876* (2013.01); *G21K 1/06* (2013.01);
(Continued)

(58) Field of Classification Search
CPC .... G21K 1/06; G21K 2201/067; G21K 1/062; G21K 1/067
(Continued)

(56) References Cited

U.S. PATENT DOCUMENTS 2,679,474 A     5/1954   Szmul
3,542,453 A  *  11/1970  Kantor ................ G02B 5/1857
                                                    216/24
(Continued)

FOREIGN PATENT DOCUMENTS

DE       1805058      5/1969
EP         55554      7/1982
(Continued)

OTHER PUBLICATIONS

Mohammad J. Moghimi et al., "Micro-Fresnel-Zone-Plate Array on Flexible Substrate for Large Field-of-View and Focus Scanning," Scientific Reports, vol. 5, 15861 (2015).*
(Continued)

*Primary Examiner* — Allen C. Ho
(74) *Attorney, Agent, or Firm* — Lathrop & Gage LLP

(57) ABSTRACT

The invention concerns to a method of producing a Fresnel Zone Plate (1) for applications in high energy radiation including the following steps: supply of a substrate (2) transparent for high energy radiation, deposition of a layer (3) of a metal, a metal alloy or a metal compound on a planar surface (4) of the substrate (2), calculating a three dimensional geometrical profile (5) with a mathematical model, setting up a dosage profile (6) for an ion beam of the ion
(Continued)

beam lithography inverse to the calculated three dimensional geometrical profile (5) and milling a three dimensional geometrical profile (5) with concentric zones into the layer (3) with ion beam lithography by means of focused ion beam.

28 Claims, 10 Drawing Sheets

(52) U.S. Cl.
CPC ........ *G21K 1/062* (2013.01); *G21K 2201/067* (2013.01); *Y10T 29/49982* (2015.01)
(58) Field of Classification Search
USPC .......................................................... 378/145
See application file for complete search history.

(56) References Cited

U.S. PATENT DOCUMENTS

| | | | | |
|---|---|---|---|---|
| 4,340,283 A | * | 7/1982 | Cohen | G02B 5/1895 351/159.41 |
| 4,360,586 A | * | 11/1982 | Flanders | G02B 5/1857 250/482.1 |
| 4,630,094 A | * | 12/1986 | Wiley | G03F 1/20 257/746 |
| 4,643,752 A | * | 2/1987 | Howard | G02B 3/08 264/1.7 |
| 4,645,523 A | * | 2/1987 | Howard | G02B 3/08 264/1.7 |
| 5,071,207 A | * | 12/1991 | Ceglio | G02B 5/188 250/505.1 |
| 5,086,015 A | * | 2/1992 | Itoh | H01L 21/76802 148/DIG. 46 |
| 5,114,513 A | | 5/1992 | Hosokawa et al. | |
| 5,204,887 A | * | 4/1993 | Hayashida | B82Y 10/00 378/145 |
| 5,216,699 A | * | 6/1993 | Iketaki | G21K 7/00 378/161 |
| 5,257,132 A | * | 10/1993 | Ceglio | G02B 5/188 359/565 |
| 5,382,342 A | | 1/1995 | Bionta et al. | |
| 5,450,463 A | * | 9/1995 | Iketaki | G21K 7/00 378/43 |
| 5,719,915 A | | 2/1998 | Koike et al. | |
| 5,900,637 A | * | 5/1999 | Smith | G03F 7/70291 250/492.22 |
| 6,214,178 B1 | * | 4/2001 | Chakrabarti | H01S 5/028 204/192.34 |
| 6,259,764 B1 | * | 7/2001 | Evans-Lutterodt | G21K 1/06 378/34 |
| 6,391,803 B1 | | 5/2002 | Kim et al. | |
| 6,618,174 B2 | * | 9/2003 | Parker | G02B 5/32 219/121.6 |
| 6,885,503 B2 | * | 4/2005 | Yun | G02B 3/08 355/53 |
| 6,960,773 B2 | * | 11/2005 | Menon | G03F 7/70291 250/492.2 |
| 7,042,982 B2 | * | 5/2006 | Pau | G21K 7/00 250/396 R |
| 7,054,070 B2 | * | 5/2006 | Matsumoto | G02B 3/0087 359/652 |
| 7,119,953 B2 | * | 10/2006 | Yun | A61B 6/484 359/368 |
| 7,264,905 B2 | * | 9/2007 | Nagamura | G03F 1/74 430/5 |
| 7,268,012 B2 | | 9/2007 | Jiang et al. | |
| 7,268,945 B2 | * | 9/2007 | Yun | B82Y 10/00 359/361 |
| 7,365,909 B2 | * | 4/2008 | Yun | G02B 3/08 216/26 |
| 7,365,918 B1 | * | 4/2008 | Yun | G21K 1/06 359/741 |
| 7,376,316 B2 | * | 5/2008 | Sasaki | C03B 37/01807 385/123 |
| 7,394,890 B1 | * | 7/2008 | Wang | G21K 1/06 378/43 |
| 7,440,546 B2 | * | 10/2008 | Liu | B82Y 10/00 378/84 |
| 7,449,699 B1 | * | 11/2008 | Adams | H01J 37/228 250/307 |
| 7,452,820 B2 | * | 11/2008 | Bloom | G02B 5/1857 257/E21.026 |
| 7,474,729 B2 | * | 1/2009 | Yoon | G21K 7/00 378/34 |
| 7,667,819 B2 | * | 2/2010 | Menon | G03F 7/2057 355/18 |
| 7,714,988 B2 | * | 5/2010 | Menon | G03F 7/203 355/18 |
| 7,901,736 B2 | * | 3/2011 | Maula | C03C 17/3417 359/589 |
| 7,969,650 B2 | * | 6/2011 | Marks | B82Y 20/00 359/363 |
| 8,047,653 B2 | * | 11/2011 | Akahane | B82Y 30/00 353/121 |
| 8,179,578 B2 | * | 5/2012 | Rosen | G03H 1/0005 359/29 |
| 8,405,890 B2 | * | 3/2013 | Rosen | G03H 1/0005 359/29 |
| 8,542,421 B2 | * | 9/2013 | Rosen | G03B 35/02 359/29 |
| 8,879,147 B2 | * | 11/2014 | Schonbrun | G02B 5/1885 359/385 |
| 9,153,453 B2 | * | 10/2015 | Bouet | H01L 21/3065 |
| 9,291,578 B2 | * | 3/2016 | Adler | G01N 23/04 |
| 9,360,603 B2 | * | 6/2016 | Schuetz | G02B 5/1876 |
| 9,366,786 B2 | * | 6/2016 | Je | B82Y 10/00 |
| 9,640,291 B2 | * | 5/2017 | Feser | G21K 1/06 |
| 2004/0130785 A1 | | 7/2004 | Yun et al. | |
| 2005/0007675 A1 | | 1/2005 | Matsumoto et al. | |
| 2006/0134433 A1 | | 6/2006 | Maula et al. | |
| 2006/0204189 A1 | | 9/2006 | Sasaki et al. | |
| 2008/0094710 A1 | * | 4/2008 | Endoh | G02B 5/1876 359/565 |
| 2009/0052619 A1 | * | 2/2009 | Endoh | G01N 23/04 378/43 |

FOREIGN PATENT DOCUMENTS

| | | |
|---|---|---|
| JP | 63007373 | 1/1988 |
| JP | 1003602 | 1/1989 |
| JP | 2001324459 | 11/2001 |
| JP | 2002008575 | 1/2002 |
| JP | 2004145006 | 5/2004 |
| JP | 2004145066 | 5/2004 |
| JP | 2005010757 | 1/2005 |
| WO | WO2004012236 | 2/2004 |
| WO | WO2011/054651 | 5/2011 |

OTHER PUBLICATIONS

M. Mayer et al., "Multilayer Fresnel zone plate for soft X-ray microscopy resolves sub-39 nm structures," Ultramicroscopy 111, 1706-1711 (2011).*
E. Di Fabrizio et al., "High-efficiency multilevel zone plates for keV X-rays," Nature, vol. 401, 895-898 (Oct. 28, 1999).*
Michael J. Vasile et al., "Depth control of focused ion-bam milling from a numerical model of the sputter process," Journal of Vacuum Science & Technology B17, 3085 (1999).*
H. C. Kang et al., Nanometer Linear Focusing of Hard X-Rays by a Multilayer Laue Lens, Physical Review Letters 96, 127401 (2006).*
Search Report, dated Jun. 3, 2013, corresponding to International Application No. PCT/EP2013/054646 (filed Mar. 7, 2013), parent of the present application, 7 pp.
Search Report and Written Opinion, dated Oct. 28, 2013, corresponding to International Application No. PCT/EP2013/054646 (filed Mar. 7, 2013), parent of the present application, 16 pp.

(56) References Cited

OTHER PUBLICATIONS

Callegari et al. (2009) "Optimized Fabrication of Curved Surfaces by a FIB for Direct Focusing with Glass Fibres," J. Micromech. Microeng. 19:1-5.
Garg et al. (2006) "Novel Method for Fabrication of High Efficiency Optics for Short Wavelength Radiation," Micromachining Technology for Micro-Optics and Nano-Optics IV, Proc. of SPIE 6110:61100S, 3 pp.
Ilinski et al. (2001) "X-Ray Zone Plate Fabrication Using a Focused Ion Beam," Advances in X-Ray Optics, Proc. of SPIE 4145:311-316.
Keskinbora et al. (2013) "Ion Beam Lithography for Fresnel Zone Plates in X-Ray Microscopy," Optics Express 21(10), 10 pp.
Malek et al. (2000) "Focused Ion Beam Direct Micromachining of DOEs," Micro-Opto-Electro-Mechanical Systems, Proc. of SPIE 4075:167-172.
Surpi et al. (2007) "Focused Ion Beam Fabrication Procedures of X-Ray Micro Fresnel Zone Plates," J. Micromech. Microeng. 17:617-622.
European Examination Report for corresponding European application No. EP 13707893.7, dated Oct. 20, 2016, 5 pages.

\* cited by examiner

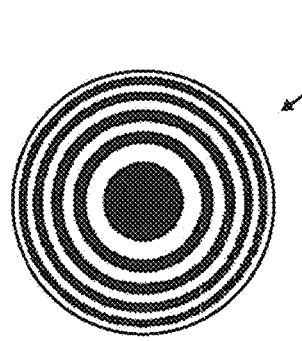
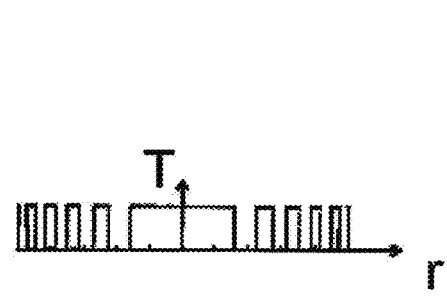
Fig. 1a
Fig. 1b
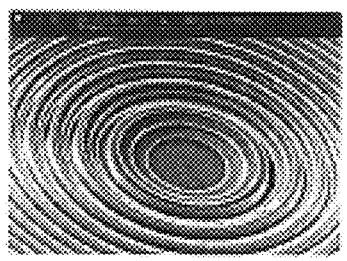
Prior Art
Fig. 2
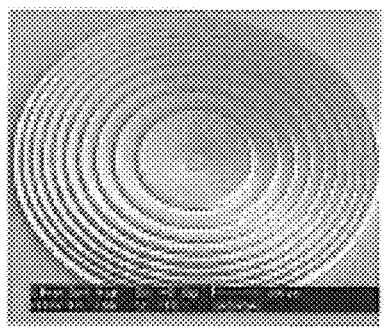
Prior Art
Fig. 3
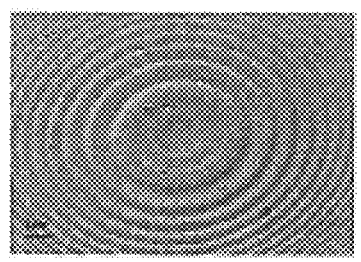
Prior Art
Fig. 4
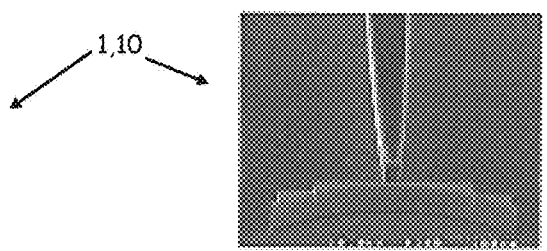
Prior Art
Fig. 5

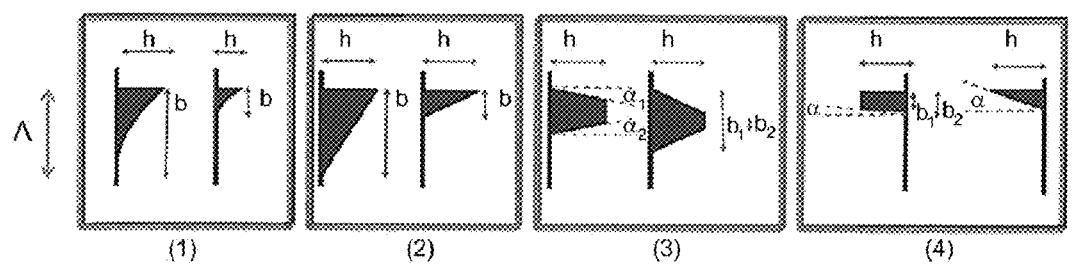
Fig. 8
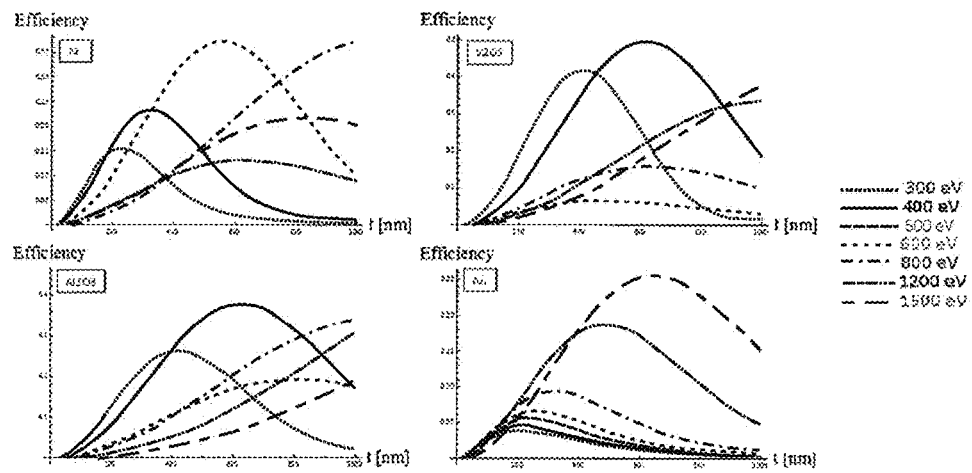
Fig. 9
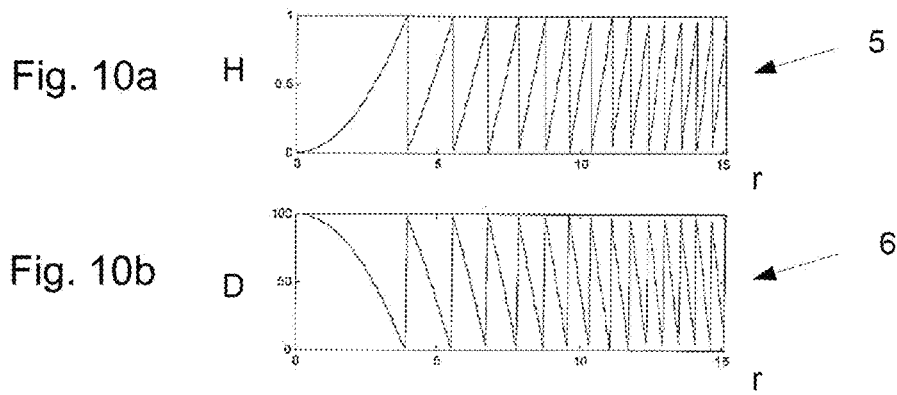
Fig. 10a
Fig. 10b

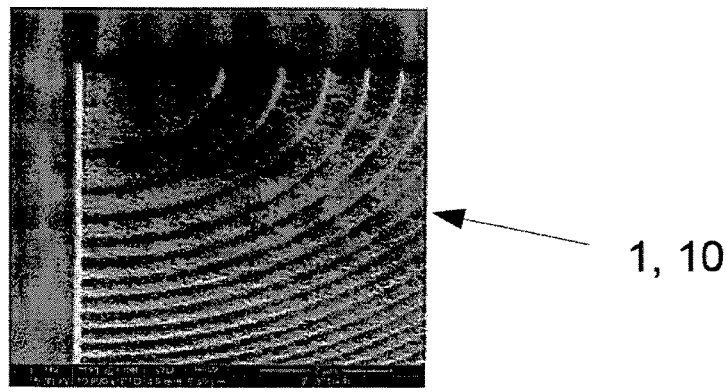
Fig. 14
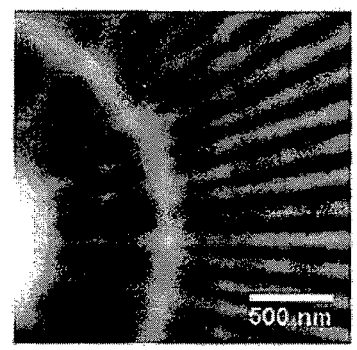
Fig. 15a
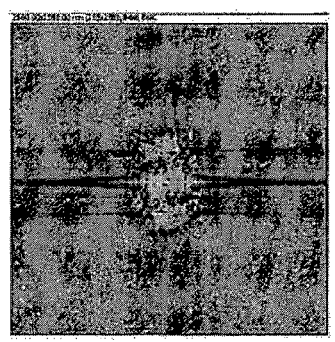
Fig. 15b
Fig. 15c
| Point | R nm |
|---|---|
| 1 | 113.92 |
| 2 | 123.03 |
| 3 | 109.36 |
| 4 | 116.6 |
| Mean | 115.7275 |
| Std Dev | 5.712556 |

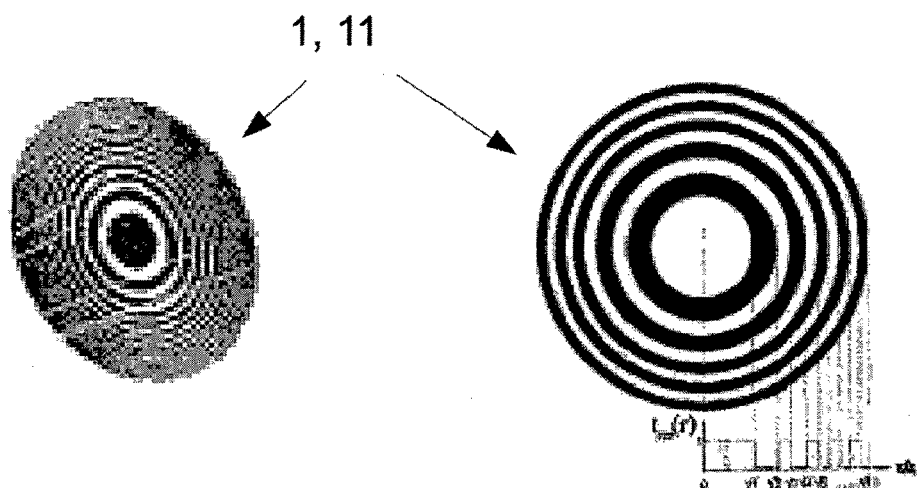
Fig. 16
Fig. 17
Fig. 18
1, 10
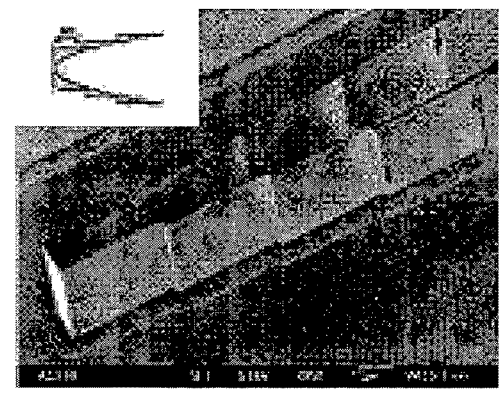
Fig. 19

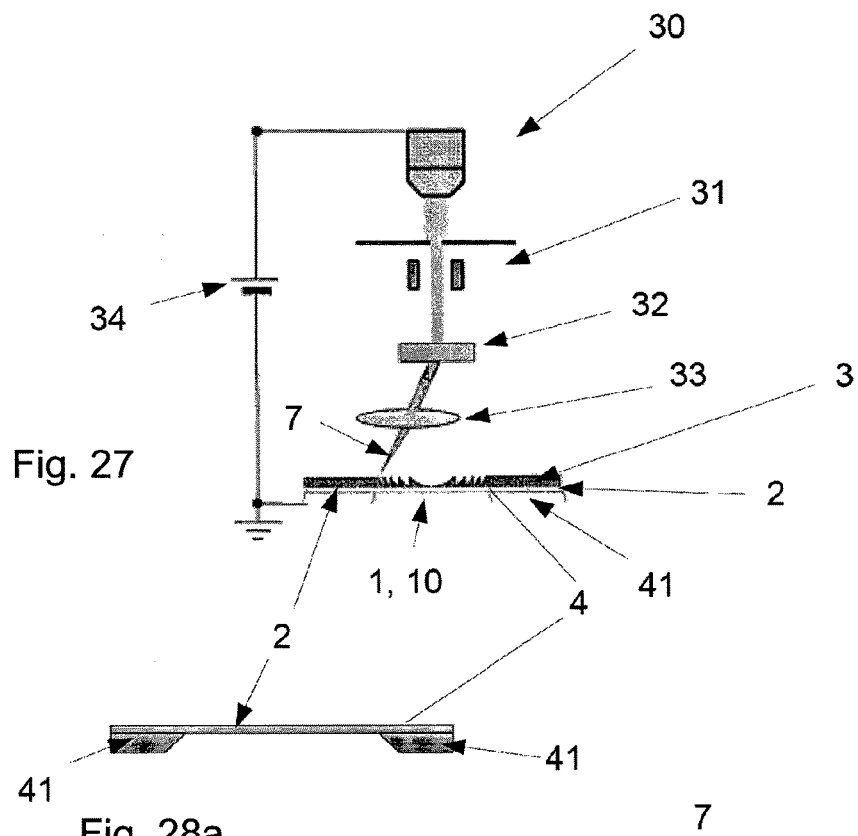
Fig. 27
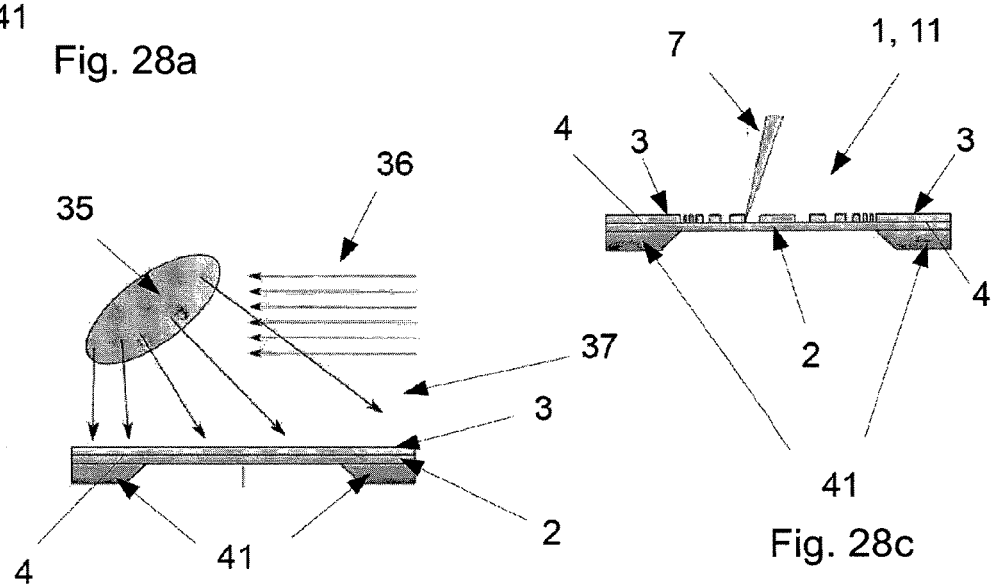
Fig. 28a
Fig. 28b
Fig. 28c

METHOD OF PRODUCING A FRESNEL ZONE PLATE FOR APPLICATIONS IN HIGH ENERGY RADIATION

CROSS-REFERENCE TO RELATED APPLICATIONS

This application is a U.S. National Stage Application filed under 35 U.S.C. §371 of International Application No. PCT/EP2013/054646, filed Mar. 7, 2013, which claims the benefit of European Application No. 12 158 669.7, filed Mar. 8, 2012. Both of these applications are hereby incorporated by reference in their entireties.

The invention concerns to a method of producing a Fresnel Zone Plate (FZP) for applications in high energy radiation. Further, the zone plates, in particular the kinoform fresnel zone plates (K-FZP) and trapezoidal Fresnel Zone Plates (t-FZP) with slanted sidewalls obtained by such a producing method, are subject of the present invention.

High energy radiation imaging such as for instance X-ray microscopy and X-ray imaging play an important role in the investigation of objects at the nanometer and micrometer scales. Apart from their well-known large penetration depth in matter allowing the imaging of thick samples, the success of X-ray microscopy is closely related to the combination of high spatial, chemical, magnetic and time resolution. The potential resolution of X-ray microscopy is in the order of magnitude of the wavelength which ranges from 1-20 nm in the soft X-ray or extreme ultra violet regime to 0.01-1 nm in the hard X-ray range and is below 0.01 nm for gamma rays. Nevertheless, up to now such resolutions remain inaccessible, due to the lack of suitable focusing devices. All three phenomena, refraction, reflection and diffraction have been used to focus X-rays and to design and construct X-ray lenses. The best resolutions so far have been achieved by using a diffractive based focusing optic constituted of a set of concentric zones called Fresnel Zone Plate (FZP). Such Fresnel Zone Plates (FZP) consist in concentric zones of absorbing and transparent materials or alternatively of appropriate phase shifting materials. The placement of the zones is given by equation (1)

$$r_n^2 = n\lambda f + \frac{n^2\lambda^2}{4} \quad (1)$$

where $r_n$ is the radius of the $n^{th}$ zone, $\lambda$ is the wavelength of the light and f is the focal length of the FZP.

To date, FZPs are one of the preferred elements for the focusing of X-rays where they bring the highest resolutions. The resolution of a FZP is limited by the width of its outermost zone according to equations (2-1) and (2-2), $$R_{Ray} = \frac{1.22\, \Delta r}{m} \quad (2\text{-}1)$$

or $$R_{Spar} = \frac{0.95\, \Delta r}{m} \quad (2\text{-}2)$$

where $R_{Ray}$ is the Rayleigh resolution, $R_{Spar}$ is the Sparrow resolution of the FZP, $\Delta r$ the width of its outermost zone and m is the diffraction order.

Accordingly, in their first diffraction order, standard Fresnel Zone Plates (s-FZP) allow resolutions which are essentially comparable to the width of their outermost zone.

As the efficiency of a FZP decreases with the square of the diffraction order, FZP are usually used in their first order of diffraction and the achievement of higher resolution implies the fabrication of FZPs with very thin outermost zones ($\Delta r$) which is a highly challenging fabrication issue. To date the best resolutions are achieved by FZPs fabricated with Electron Beam Lithography (EBL) based methods which allow routinely the construction of FZPs with $\Delta r$ down to 25 nm leading to practical resolutions of 30-40 nm. FZP with resolutions down to 12 nm or 9 nm have also been reported.

Such FZPs are extensively used in X-ray microscopes especially at synchrotron radiation facilities or in Laboratory X-ray microscopes from extreme ultra violet to hard X-ray wavelength for high resolutions imaging. FIGS. 1a and 1b show a profile of a standard Fresnel Zone Plate (s-FZP). The period $\Lambda$ of a s-FZP is constituted of 2 zones.

Nevertheless, such s-FZPs present major drawbacks with respect to their efficiencies and to their further improvements towards better resolutions.

As the resolution of a s-FZP in its first diffraction order is essentially comparable to the width of its outermost zone, the fabrication of s-FZP with high resolution implies the manufacturing of very thin zones and thus, corresponding adequate manufacturing technologies are required. To date, the fabrication of zones with widths down to 10 nm remains a highly challenging issue.

The efficiency of a FZP defined as the fraction of incident light collected in the first order focus is limited to a maximum theoretical value of 10% for amplitude FZPs and to 40% for phase FZP, where the material constituting the zones are respectively purely absorbing and purely phase shifting.

In practice, commercially available high resolution gold s-FZPs fabricated with Electron Beam Lithography (EBL) making use of the first diffraction order and dedicated to soft X-ray microscopy present typically outermost zone widths of 25 nm, thicknesses of 100 to 300 nm and diameters of 100 to 250 μm corresponding to focal lengths ranging from 2.5 to 6.2 mm. They lead to measured resolutions of about 30 nm-40 nm and overall efficiencies of about 3% to 5% depending on the quality of the zones and on other components of the optical device, such as the substrate on which the FZP has been fabricated.

To circumvent those limitations in both resolution and/or efficiencies FZPs with alternative profiles have been envisaged. Most of those alternatives have been developed either by considering refraction phenomena in a purely geometric approach or by taking diffraction, refraction and reflection phenomena in or at the surface of the zones within the framework of various models. Those considerations have permitted the design of alternative forms for FZPs for which the efficiencies and resolutions should be dramatically improved. Some examples of such alternative forms of FZPs are for instance kinoform zone plates (K-FZPs) which may reach 100% efficiency for ideal purely phase shifting materials, volume FZP with tilted zone or reflection Bragg Fresnel zone plate.

Predictions for real material as for instance gold or nickel according to the geometrical approach foresee that K-FZP made out of gold working at 1500 eV or nickel working at 600 eV manufactured in a 650 nm respectively 550 nm thick layer with a period $\Lambda$ of 100 nm and an expected diffraction limited Rayleigh resolution of 61 nm should deliver about 26% and 37% efficiencies respectively. Such high efficiencies would be of particular interest for applications where high fluxes are required as for laboratory microscopes or for coherent imaging as ptychography. For K-FZP with higher aspect ratios and higher potential resolution, the geometrical approximation does not apply anymore and other theories have to be applied as for instance the coupled wave theory which predicts that the diffraction efficiency of a sawtooth FZP similar to the Kinoform profile out of Nickel with a period $\Lambda$ of 40 nm and a height of 400 nm, for which a diffraction limited Rayleigh resolution of about 24.4 nm is expected should deliver efficiencies of about 14%.

To further increase the resolution of FZPs above the mentioned values while keeping their efficiencies at high levels, other geometries are required. In particular, it has been predicted that volume zone plates with zones which are tilted towards the optical axis and with adequate line to space ratios should lead to both higher resolutions and efficiencies especially at high diffraction orders. In the case of Nickel a FZP of 700 nm thickness with 30 nm outermost zone width, tilted towards the optical axis according to the Bragg conditions for the third diffraction order would lead to efficiencies above 20% and a diffraction limited resolution of 13 nm.

A further strategy which has been followed to increase the efficiency of a FZP at higher order of diffraction allowing for higher resolution at reasonable efficiencies implies a displacement of the zones and changes in the width of the lines and space within one period of the FZP. For instance it has been shown that a line to space ratio of 1.3 (M. Baciocchi, R. Maggiora, and M. Gentili, "HIGH-RESOLUTION FRESNEL ZONE PLATES FOR SOFT X-RAYS," Microelectronic Engineering 23, 101-104 (1994)) increases the efficiency of the 2nd order to one fourth of the 1st order efficiency. Besides the change of the line to space ratio, other strategies are possible as for instance a change in the 3D profile of the zone.

Those alternative forms of FZPs all have in common to present complex 3-Dimensional profiles and they are extremely difficult to realize in practice.

To date a few strategies have been envisaged for the manufacturing of those alternative profiles:

As far as K-FZP are concerned some manufacturing trials have been reported:

As shown in FIG. 2 Di Fabrizio (Di Fabrizio E, Romanato F, Gentili M, et al. High-efficiency multilevel zone plates for keV X-rays. Nature. October 1999; 401(6756):895-898) approaches the K-FZP structure with over-layered Electron Beam Lithography.

As shown in FIG. 3 Krizmanic (Krizmanic J, Morgan B, Streitmatter R, et al. Development of ground-testable phase fresnel lenses in silicon. Exp. Astron. December 2005; 20(1-3):299-306) approaches the the K-FZP structure with gray scale optical lithography and Reactive ion etching.

As shown in FIG. 4 Garg (Garg R, Evertsen 1, Denbeaux G. Novel method for fabrication of high efficiency optics for short wavelength radiation—art. no. 611005. In: Johnson E G, Nordin G P, Suleski T J, eds. Micromaching Technology for Microoptics and Nano-Optics IV. Vol 6110. Bellingham: Spie-Int Soc Optical Engineering; 2006:S1100-S1100) approaches the K-FZP structure with focused ion beam in step approximation.

In those three cases the profile has been approached with a step approximation. Multilayer approaches of the K-FZP profiles according to the sputter sliced technique have also been reported. In all those cases the manufactured K-FZPs present a relatively low number of zones, a relatively low quality and none of the manufactured K-FZPs have proven to be able to perform X-ray imaging.

The manufacture of 1 dimensional K-FZP dedicated to hard X-ray has also been reported and realized by using dry etching according to the Bosch process as shown in FIG. 5. In that case the incoming light is only focused to a line.

As for the realization of volume zone plate with tilted angles, fabrications with over-layered Electron Beam Lithography have been reported (Rehbein 5, Schneider G. Volume Zone Plate Development at Bessy. Proc. 8th Int. Conf. X-ray Microscopy. 2005:103-106.) but imaging performance of the realized zone plates have not been shown. The fabrication of 1-dimensional tilted zone plate has been reported. It has allowed the focusing of light to a linear focus of 30 nm. The crossing of two such 1-dimensional lenses has allowed the focusing of light to a spot of 25 nm×27 nm with an efficiency of 2%.

It is therefore the object of this invention to provide an alternative method for producing a fresnel zone plate for applications in x-ray radiation with a sufficient resolution and efficiency. A further object of the invention is to get alternative FZPs with a sufficient resolution and efficiency for applications in x-ray radiation.

Regarding the method and the fresnel zone plate, these objects are solved by a method and fresnel zone plate with features as described herein.

The method of the invention for producing a fresnel zone plate for applications in high energy radiation including the following steps:
  supply of a substrate transparent for high energy radiation,
  deposition of a layer of a metal, a metal alloy or a metal compound on a planar surface of the substrate,
  calculating a three dimensional geometrical profile with a mathematical model,
  setting up a dosage profile for an ion beam of the ion beam lithography inverse to the calculated three dimensional geometrical profile and
  milling the three dimensional geometrical profile with concentrically zones into the layer with ion beam lithography by means of focused ion beam.

Due to this inventive method it is possible to produce freznel zone plates with a very high resolution and efficiency wherein at the same time the production steps are minimized in comparison with the state of the art of producing FZPs. The delivered FZPs can directly be used to focus X-rays in corresponding apparatus like microscopes for X-ray radiation.

Especially for K-FZPs produced with the inventive method it was found that the production is possible without a simplification of the structure of the K-FZPs so that a qualitative high grade K-FZP is given. The structure of a so produced K-FZP is very close to the theoretically calculated structure.

For the t-FZPs with slanted sidewalls it was found that its production with the inventive methods leads to trapezoid structure of the zones instead of rectangular structures of s-FZP. This leads to a significant higher resolution than those obtainable with s-FZPs produced with methods known from the state of the art. This is due to the structure of the produced t-FZPs which contains slanted walls within its structure which activates $2^{nd}$ order focus with twice resolution.

With the inventive method it is not only possible to produce K-FZPs and t-FZP. Rather it is possible to produce alternative FZPs presenting complex three dimensional profiles for use in high efficiency and high resolution X-ray focusing.

The invention is a method, which allows the fabrication of FPZ profiles that cannot be pre-pared by known processes. Ion Beam Lithography (IBL) is particularly appropriate to produce 3D structure, this means that it would allow the almost exact reproduction of the theoretically required profiles; the step approximation required by the known Electron Beam Lithography (EBL) based processes is not necessary anymore. IBL allows the preparation of the profile in only one process step instead of the many process cycles required by EBL, where the step approximation requires a whole EBL process per step and complex alignment procedure. New IBL device as described in allows a precise alignment during the preparation and a well-defined beam shape which will allow the preparation of alternative FZPs with high accuracy.

Furthermore it has been shown that good results could be reached if the layer was made of Gold or Nickel and if as substrate material silicon or a silicon compound is used. Other preferred material have been determined and are compounds or pure material of Ir, Al, B, Cu, Fe, Ni, Ba, In, La or U.

According to a first arrangement of the inventive method the deposition of the layer on the substrate is performed until the layer have reached a thickness between 50 nm and 4000 nm, preferable between 150 nm and 1000 nm, especially 500 nm. It has been shown that these dimensions of the thickness of the layer are most suitable for applications in X-ray radiation and extreme ultra violet radiation.

In a further preferable arrangement of the inventive method the three dimensional geometrical profile is calculated according to the equations $$t(r)=\text{Mod }[(r/F)^2,1]$$

and $$F=B\sqrt{f/E}$$

where t(r) is the height of the fresnel zone plate as a function of its radius r, Mod is the modulo function where 1 is the dividend, F is a parameter in μm which depends on the focal length f and on the operating energy E of the fresnel zone plate and on a constant B. It could be shown that best results for the produced FZP could be reached if the constant B has a value between 45 and 55, especially if B is equal to 49.8.

In the following the parameters for the ion beam and the milling which are used to produce FZPs according to the inventive method are described:

The dosage D of the ion beam is given by the equation $$D=t*I/A$$

where t is the dwell time, I is the ion beam current and A is the area size of a pixel to be milled. The dwell time is defined as the time in which the ion beam is focused on the pixel to be milled.

It could be shown that a dwell time t of at least 100 ns and of at most 5 ms, preferable between 1 μs and 600 μs, especially of 3 μs for producing K-FZPs or especially of 1.4 μs for producing t-FZPs leads to good results in the structure of the produced FZPs for its use in a X-ray radiation focusing apparatus.

Therefore preferably an ion beam current between 1 pA and 100 pA, preferable between 10 pA and 70 pA, especially of 30 pA for producing K-FZPs or especially of 50 pA for producing t-FZPs is used.

An ion beam energy between 5 keV and 100 keV, preferable between 10 keV and 50 keV especially of 30 keV is used. With this ion energies together with the before defined dwell time good results in an acceptable time range while producing the FZPs could be reached The produced FZPs are for use with operating energy E between 150 eV and 90 keV, preferable between 1000 eV and 17 keV, especially of 1200 eV or 15 keV. The operating energy E can even be higher if Fresnel Zone Plates for applications in gamma radiation are used.

According to a particular useful arrangement of the inventive method a drift correction for the ion beam is used during the production of the FZPs. This arrangement prevents the drifting of the ion beam during milling over the production time. After a defined time it is controlled if the ion beam is positioned on the right place on the layer where it should be positioned on. If the ion beam is not positioned on that position the drift correction would take place so that the ion beam is positioned over the right place of the layer again.

For that drift correction an alignment mark on the layer is used. Each time the drift correction take place the ion beam is positioned over the alignment mark. After the positioning of the ion beam on that alignment mark and after necessary corrections are made the milling process can be continued with the knowledge that the position of the ion beam is still correct.

Preferable the ion beam milled the layer for a time between a few minutes and 36 hours, more preferable between 2 hours and 20 hours, especially for 3 hours for a K-FZPs or for 15 hours for a t-FZPs, or 12 minutes for ultrafast fabrication of t-FZPs. The milling time depends on the degree of precision which is required for the produced FZP.

For the milling of the layer a step size of 5 nm to 200 nm preferable 10 nm to 20 nm of the ion beam for producing t-FZPs or K-FZP, preferable 16 nm for producing K-FZPs is used.

Regarding a further aspect of the inventive method the substrate is used as a holder or a carrier, respectively, is mounted on a holder or a carrier so that the FZP produced on the layer is ready for use in a microscope.

Furthermore the invention regards a fresnel zone plate (FZP), preferable produced according to the inventive method, has a diameter between 20 μm and 500 μm, preferable between 40 μm and 150 μm, especially of 60 μm or 100 μm.

Preferable the FZP has a height between 100 nm and 10 μm, preferable between 200 nm and 700 nm, especially of 500 nm.

According to an other embodiment of the inventive FZP it has a period number between 30 and 5000, preferable between 35 and 400, especially between 40 and 150 for K-FZPs or between 80 and 300 for t-FZPs wherein a period contains of one zone in cases of K-FZPs or alternative FZPs and wherein a period contains of two zone in cases of t-FZPs.

An outermost period of the inventive FZP has a width between 50 nm and 10 μm, preferable between 100 nm and 500 nm, especially of 300 nm.

FZP with the before mentioned characteristics are most suitable for applications in X-ray radiation or extreme ultra violet radiation, especially for focusing X-ray radiation or extreme ultra violet radiation since the aforementioned dimensions are of the range of the wavelengths of the used radiations so that they are suitable for use in those applications.

t-FZPs with slanted sidewalls of the zones features allows the appearance of a second order imaging with resolutions twice as high as the first order and therefore a better resolution and efficiency than known s-FZPs without such slanted sidewalls of the zones.

Especially if the sidewalls are slanted between 3° and 7°, preferable between 4° and 6° to a normal of the s-FZP the $2^{nd}$ order resolution and efficiency of the t-FZPs is explicit better in comparison to s-FZPs without such slanted sidewalls of the zones.

Pattern files and milling starts with the outermost zone so that it is written first. This ensures that the zones are written in an inwards fashion. Each curved element within one zone is also written in inwards fashion.

Each element of the pattern for instance is a curved element and is written with circular beam movements. Each consecutive element of the pattern is written via alternating clockwise (CW) and counter-clockwise (CCW) beam movement. Furthermore each consecutive element is rotated relative to each other so that starting points do not coincide. The angle defined between 2 starting points and the center of two consecutive curved elements can be chosen between 45 and 180 degree. This process is necessary to ensure a continuous and regular patterning within one curved element and its neighbors without aliasing or disturbance of the structures.

Further goals, advantages, features and applications of the invention arise out of the following description of embodiments of the invention on the basis of the figures. Thereby all described and in the figures shown features alone or in arbitrary reasonable combination provides the subject matter of the invention independent of its conclusion in the claims or its dependency.

BRIEF DESCRIPTION OF THE DRAWINGS

FIGS. 1a and 1b: a profile of a standard Fresnel Zone Plate (s-FZP) with its thickness profile where only a few zones are shown for simplicity, FIG. 2: a kinoform Fresnel Zone Plate (k-FZP) manufactured with step approximation according to state of art, FIG. 3: a kinoform Fresnel Zone Plate (k-FZP) manufactured with step approximation according to state of art, FIG. 4: a kinoform Fresnel Zone Plate (k-FZP) manufactured with step approximation according to state of art, FIG. 5: a linear kinoform Fresnel Zone Plate (k-FZP) according to state of art, FIG. 8: typical zone profile shapes according to the invention, FIG. 9: examples of diffraction efficiency calculations for several materials, FIG. 10a: a thickness profile of a K-FZP, FIG. 10b: a corresponding dosage profile to the K-FZP of FIG. 10a, FIG. 11: a 2D profile of a K-FZP for fabrication with ion beam lithography (IBL) by means of focused ion beam (FIB), FIG. 15a: a STXM image of the inner most structures of a test pattern (X30-30-1, Xradia, USA) where a manufactured Gold K-FZP is used as lens imaged acquired at 1200 eV with a dwell time of 5 ms, FIG. 15b: Fast Fourier Transform (FFT) analysis of the STXM image of FIG. 15a, FIG. 15c: table of cut-off resolutions as measured in different directions on the FFT analysis of FIG. 15b, FIG. 16: a standard Fresnel Zone Plate (s-FZP), FIG. 17: a profile of a standard Fresnel Zone Plate (s-FZP) with its transmission profile, FIG. 18: a sectional drawing of a kinoform profile, FIG. 19: a SEM image of a one dimensional kinoform lens for focusing hard X-rays according to the state of the art, FIG. 27: a machine during production of a FZP and FIGS. 28a to 28 c: the steps of producing a FZP

Figure 6:
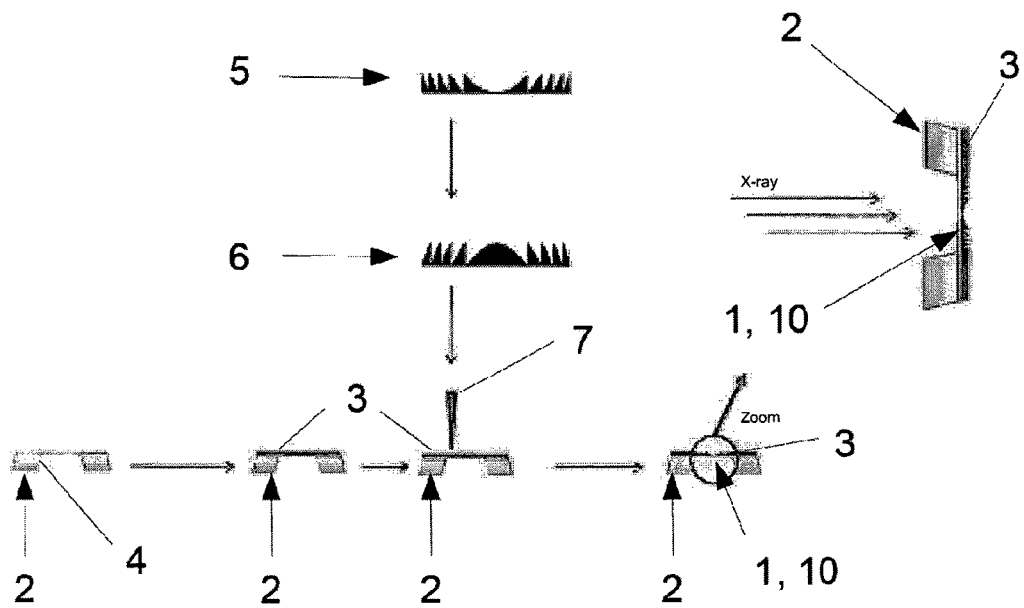
FIG. 6: the steps of producing an alternative FZP according to the invention on the front side of the substrate.
Figure 7:
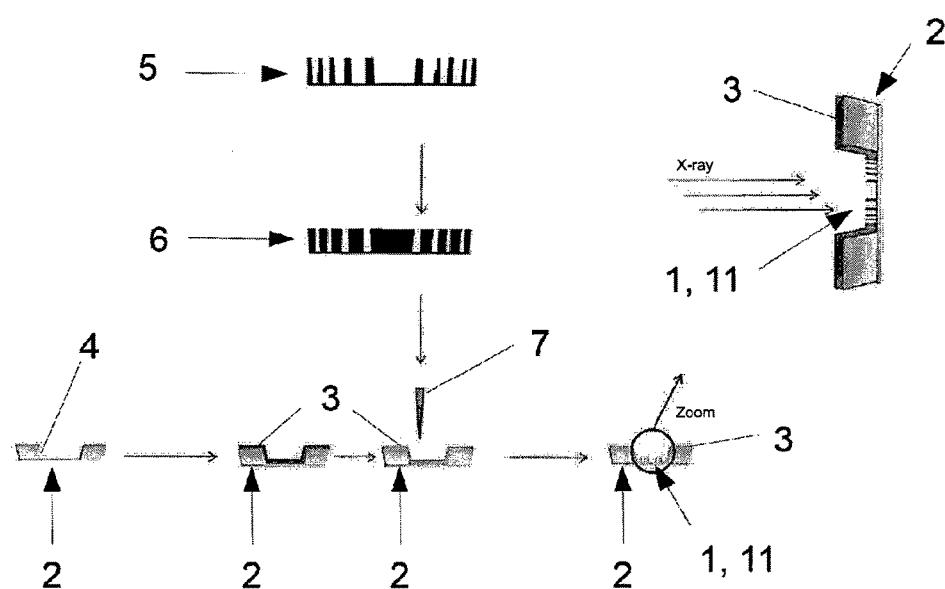
FIG. 7: the steps of producing an alternative FZP according to the invention on the back side of the substrate.

The invention relates to a method to produce a Fresnel Zone Plate (FZP) 1, 10, 11 for applications in high energy radiation. The FZP 1, 10, 11 could be a trapezoid fresnel zone plate (t-FZP) 11, a kinoform fresnel zone plate 10 or an alternative fresnel zone plate which presents a complex 3-dimensional profile. Such FZPs 1, 10, 11 are used for high efficiency and high resolution X-ray focusing. According to the invention, these FZPs 1, 10, 11 are fabricated through a procedure which is shown in FIG. 6 and FIG. 7.

In a first stage, a material is chosen for its appropriate optical properties a layer 3 for the FZPs 1, 10, 11. The layer 3 with adequate thickness of the chosen material is deposited on a surface 4 of a substrate 2 transparent for high energy radiation. The layer 3 can be deposited on a surface 4 of the front side or on the back side of an substrate 2 transparent for high energy radiation, where the back side and front side are defined according to the direction of the radiation propagation. The front side is defined as the side where the radiation leaves the substrate 2 and the back side is defined as the side where the radiation enters the substrate 2.

The best suited material has to be chosen according to the theoretical efficiency of the resulting FZP 1, 10, 11 accessibility and ease of processing with IBL. Typically metals, metal-alloys and -compounds, ceramics as well as some non-metal and metalloids like silicon and silicon compounds are appropriate. As for ease of fabrication metals and in general conductive materials and ideally an amorphous or single crystalline thin film are particularly well suited for machining in IBL due to reduced charging in conducting materials and better milling qualities.

For the deposition of the layer 3 on the substrate 2 any deposition technique can be envisaged such as, sputtering, CVD, PVD, ALD, MBE etc.

Then, the three-dimensional geometrical profile 5 of the FZP 1, 10, 11 is calculated and optimized for the chosen material and transferred to the corresponding dosage profile 6 in an appropriate format to allow for gray scale Ion Beam Lithography (IBL) without step approximation. Formats that can be used are for instance gray scale bitmap files and Graphic Database System (GDS II) files. The quality of the reproduction is determined by the number of pixel used in the construction. The dosage of the pattern may be presented to the focused ion beam (FIB) devices as GDSII files or bitmaps or ascii or other Drawing Exchange Format (DXF) like format (not only GDSII).

Finally, the desired structure is milled in the material of the layer 3 by ion beam lithography according to the previously generated dosage profile 6. This delivers the FZP 1, 11, 10, which can directly be used as a lens, where the radiation is coming from the back side of the substrate 2.

FIG. 6 represents the fabrication scheme of a K-FZP 10 according to the invention prepared on the front side of the substrate 2.

FIG. 7 represents the fabrication scheme of a t-FZP 11 according to the invention on the back side of the substrate 2.

Typical FZP profiles that can be prepared according to the invention can be constituted of zones of various widths b down to a few nanometers with parabolic, elliptical or linear decreasing slopes at variable angles as shown in FIG. 8. Each of the zones constituting the whole FZP can present a different shape.

FIG. 8 shows typical zone profile shapes according to invention. Here, $\Lambda$ is the period (a period corresponds to 2 zones in a t-FZP 11), h is the height of a zone, b the width of a zone, b1 and b2 the bottom and top width of a zone respectively, $\alpha$, $\alpha 1$, $\alpha 2$ are the angles characteristic for the inclination of the slope as represented in FIG. 8(3) and FIG. 8(4).

In FIG. 8(1) a parabolic or elliptical profile manufactured on the top side of the substrate 2.

In FIG. 8(2) a linear profile manufactured on the top side of the substrate 2.

In FIG. 8(3) trapezoidal profile with b1>b2 manufactured on the top side of the substrate 2.

In FIG. 8(4) a right trapezoidal profile with b1<b2 manufactured on the back side of the substrate 2.

In the following an example of producing a K-FZP 10 according to the invention is described: Theoretical calculations for the efficiency have been performed according to the geometrical approximation developed by Kirz (J. Kirz, Journal of the Optical Society of America (1974), 64, 301-309.) which is valid as long as the aspect ratio of the K-FZP 10 is not too high. Selected examples are displayed in FIG. 9 which shows examples of diffraction efficiency calculations for several materials.

From FIG. 9 it appears for instance that the K-FZP 10 out of aluminium oxide ($Al_2O_3$) would deliver more than 35% efficiency at 400 eV with 600 nm structure height. A Nickel K-FZP 10 with structure height of 500 nm would give 30% efficiency at 500 eV.

For initial trials polycrystalline Gold has been chosen due to its ease of manufacturing and high conductivity as the material for the layer 3. Since this material is more suitable for high photon energies as FIG. 9 shows, the K-FZP 10 was designed for a working energy of 1500 eV.

For the deposition of the layer 3 commercial silicon supported silicon nitride membrane (Silson, UK) with a thickness of 500 nm was used as a substrate 2 and was coated on its front side with a gold layer 3 of 500 nm via an ion beam sputtering technique.

The three dimensional geometrical profile 5 of a K-FZP 10 was calculated according to the following equations (3) and (4):

$$t(r)=\text{Mod}\,[r/F)^2,1]  \quad (3)$$

$$F=44.8\times\sqrt{f/E} \quad (4)$$

where t(r) is the height of the K-FZP 10 as a function of its radius r, Mod is the modulo function where 1 is the dividend, F (μm) is a parameter which depends on the focal length f and on the operating energy of the K-FZP 10. Parameters of the K-FZP 10 are given in table 1.

TABLE 1

Design parameters for the K-FZP, note that a period of a K-FZP corresponds to two zones of a s-FZP

| | f/μm | E/eV | Diameter/μm | Outermost period Λ/nm | Expected Rayleigh resolution/nm | Expected Sparrow resolution (cut-off frequency)/nm | Zone plate height/nm |
|---|---|---|---|---|---|---|---|
| K-FZP | 7260 | 1500 | 60 | 200 | 122<br>61 (half pitch) | 94<br>47 (half pitch) | 500 |

In Ion Beam Lithography (IBL) the three dimensional geometrical profile 5 is written in the material through Ion Beam Milling with a focused ion beam 7. The dosage of a focused ion beam 7 is given by equation (5):

$$D=tI/A \quad (5)$$

where t is the dwell time, I ion beam current, and A is the area size of the pixel. The dosage is changed by changing the dwell time. A higher dosage is applied where more material removal is desired and vice versa.

The dosage profile 6 is basically the inverse of the three dimensional geometrical profile 5 as can be seen by FIG. 10a and FIG. 10b. In our case a gray scale bit map file has been used.

Figure 11:
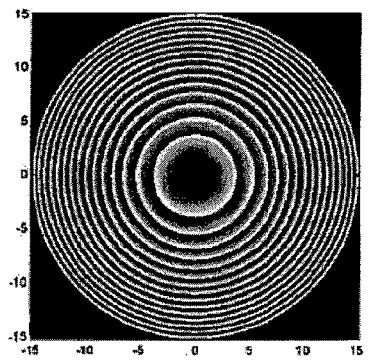

The dosage profile 6 in two dimensions is shown in FIG. 11 and it is transferred to an appropriate ion beam device 30, in this case a focused ion beam device from the company FEI (Nova NanoLab, FEI, Netherlands) is used. The included software (xTm from FEI) interprets the information contained in the dosage profile 6 linearly between a minimum dwell time (of 100 ns in the case of the xTm software) and a maximum dwell time defined by the user.

In FIG. 10a three dimensional geometrical profile 5 of a K-FZP 10 is shown and in FIG. 10b a thereto corresponding dosage profile 6.

Figure 12:
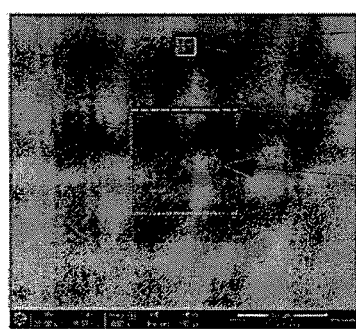
FIG. 12: a SEM image of a layer for a K-FZP where the place for the K-FZP and an alignment mark for drift correction is marked.

Parameters used for milling of the desired pattern are given in the table 2. 30 keV acceleration voltage and 30 pA current were chosen to provide a theoretical beam diameter of 16 nm and to keep the fabrication time within reasonable limits for proof-of-principle trials. The resulting process time was of about 3 hours including drift correction time. The beam current can be decreased to obtain a sharper beam at the expense of increased process time. An alignment marker 38 was constructed prior to fabrication, out of a 10×10×3 μm in situ deposited Pt layer over which an alignment marker 38 was milled. This alignment marker 38 was used for a beam shift based drift correction method using the Dynamic Drift Correction tool of the xTm software. In FIG. 12 the alignment marker 38 and the place for the K-FZP can be seen.

TABLE 2

BL parameters used in fabrication of the X-ray K-FZP of Table 1

| Process | Acceleration Voltage/kV | Current/pA | Maximum Dwell Time/μs | Number of Passes | Drift Correction | Etch Enhancement | Process Time/h |
|---|---|---|---|---|---|---|---|
| IBL | 30 | 30 | 3 | 1896 | Yes | No | 3 |

FIG. 12 shows an alignment marker 38 for drift correction and the place 12 where K-FZP 10 will be located.

Here note that it would be possible to fabricate FZPs 1, 10, 11 with diameters ranging from 40 μm to 100 μm. In the case of FZPs 1, 10, 11 with diameters close to 100 μm it might be necessary to use more sophisticated drift correction methods. By using the Nova NanoLab, FEI device it was estimated that the width of the outermost period (continued of 2 zones for a K-FZP and 1 zone for a s- or t-FZP) can be reduced to around 100 nm with a theoretical resolution of 61 nm which means 30 nm structures can be resolvable. Ultimately the finest structure that can be written will be determined by the finite size of the ion beam produced by the FIB (16 nm at 30 kV and 30 pA). Newly developed IBL Instruments are able to produce better defined ion beams with reduced beam tails. In this context, it can be expected to enable K-FZP with smaller outermost zone widths in the future. The dosage of the pattern may be presented to the FIB devices as GDSII files or bitmaps or ascii or other DXF like format (not only GDSII).

Figures 13A, 13B, 13C:
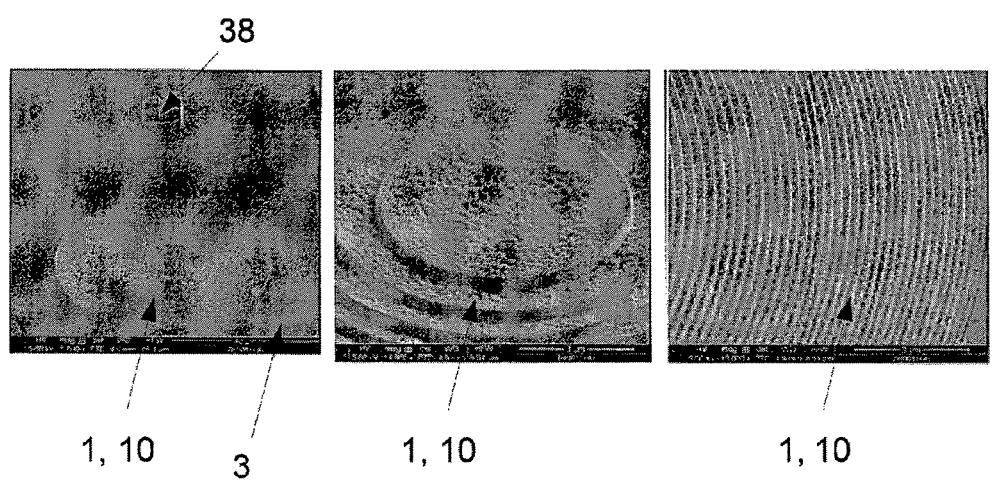
FIG. 13a: a SEM image of a layer with an alignment mark and a finished K-FZP produced according to the invention.
FIG. 13b: a SEM image of a detail of the inner zones of the K-FZP of FIG. 13a, FIG. 13c: a SEM image of a detail of the outer zones of the K-FZP of FIG. 13a, FIG. 14: a SEM image of an inner part of a K-FZP, milled in Ni with an enhanced etch (EE) gas.

In FIGS. 13a to 13c the finished K-FZP 10 can be seen.
In FIG. 13a the whole pattern with the alignment marker 38, in FIG. 13b the central part of the K-FZP 10 and FIG. 13c the outermost zones of the K-FZP 10.

It appears that the overall shape of the K-FZP 10 defined as roundness and periodicity of the zone is good in this first proof of principal. Nevertheless the surface roughness of the milled structure is high. This high roughness may be due to re-deposition phenomena which can occur during the manufacturing process.

In FIG. 14 an example can be seen where a K-FZP 10 structure has been milled in Nickel using an enhanced etch gas (iodine). The utilization of an enhanced etch gas induces an increase of the sputtering rate, hinders re-deposition phenomena and hence improve the overall quality of the surface. The rough surface of the pattern may also be caused by the polycrystalline nature of the film. Some crystallographic orientations of materials may be more resistant to the ion beam than others, creating a rough surface. This problem may be avoided by using an amorphous or single crystalline thin film of the desirable refractive index.

For instance an amorphous Si enrich Pd layer is a very good candidate due to its amorphous characteristic and relatively high sputter yield in ion beam milling.

In the innermost and outermost parts the zone height h are respectively 487 nm and 260 nm to be compared with the targeted height of 500 nm. This reduction of the height is due to parasitic milling which is caused by ion beam tails plus collateral damage caused by impinging ions. This can be improved by using a sharper beam and better patterns.

The resulting gold K-FZP 10 has been tested in a scanning X-ray microscope (MAXYMUS, HZB Bessy II Berlin):

As mentioned in table 1, the theoretical half-pitch cut off resolution of the designed pattern is 47 nm, the half pitch Rayleigh resolution of the designed pattern was 61 nm which correspond to a half pitch Sparrow resolution of 47 nm.

Using the above described gold K-FZP 10 as a lens in an X-ray scanning microscope (MAXYMUS HZB Bessy II in Berlin), X-ray imaging has been performed. An image of the inner part of a test object (X30-30-1, Xradia, USA) is shown in FIG. 15a. This is the first example of a K-FZP 10 being successfully employed to perform X-ray microscopy. The efficiency of the K-FZP 10 has been evaluated to 5.4% from an image generated by scanning a 35 μm pinhole between the K-FZP 10 and the detector with correction for background intensity.

The resolution at 1200 eV was evaluated by Fast Fourier transform (FFT) analysis from the image as shown in FIG. 15b. The cut-off half pitch resolution was found to be 57.85 nm±2.85 nm structures to be compared with the theoretical cut-off of 47 nm and Rayleigh resolution of 61 nm. The difference can be attributed to fabrication errors, nevertheless this relative good match between theoretical and experimental resolution shows that the quality of the zone placement is good and that the high surface roughness of the K-FZP 10 has a relatively lower impact on the resolution than on the efficiency.

FIG. 15c shows the cut-off resolutions as measured in different directions on FFT.

In the following the major advantages of the inventive method using Ion Beam Lithography (IBL) compared with previous methods employed to make K-FZP 10 are listed:

1. IBL is particularly appropriate to produce 3D structure, this means that it would allow the almost exact reproduction of the theoretically required Kinoform profile for K-FZPs 10; the approximations required by the Electron Beam Lithography (EBL) based processes are not necessary anymore.
2. IBL allows to the preparation the profile for K-FZPs 10 in only one step instead of the many steps required by EBL or multilayer approaches.
3. New IBL device allows a precise alignment during the preparation and allow the preparation of t-FZPs 11 with high accuracy.

There was a previous attempt to produce K-FZP 10 with a focused ion beam (FIB).

According to that state of art K-FZP lenses 40 are in only one dimension as shown in FIG. 19 instead of two dimensions as it is claimed by the invention. Nevertheless the invention is not limited to produce K-FZPs 10. Rather t-FZPs 11 and alternative FZPs can be produced according to the invention.

Figure 20:
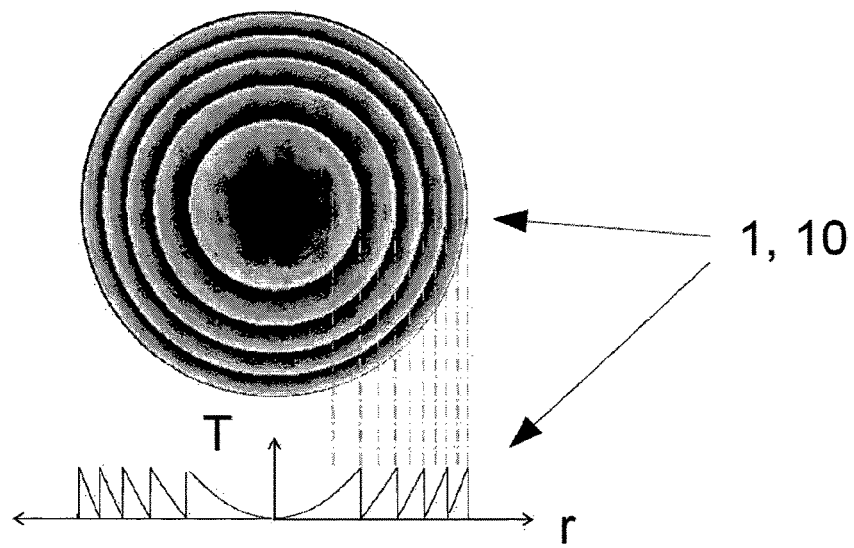
FIG. 20: a profile of a kinoform Fresnel Zone Plate (K-FZP) with its thickness profile.

FIG. 20 shows the profile of a K-FZP 10 which should produced by the method of the invention wherein in FIG. 20 only a few zones of the s-FZP 11 are shown for simplicity)

The design parameters of the t-FZP 11 are shown in table 3a.

TABLE 3a design parameters of the t-FZP 11

| K-FZP Material | Working Energy/eV | Zone plate height/nm | FZP type | f/μm (1st Order) | Number of periods | Diameter/μm | Outermost period width Λ/nm |
|---|---|---|---|---|---|---|---|
| Gold (sputtered) | 1200 | 500 | Positive FZP | 9640 | 251 | 100 | 200 |

The targeted optical performance of the t-FZP 11 (corresponding to the theoretical calculations based on design parameters) is shown in table 3b:

TABLE 3b targeted optical performance of the t-FZP 11

| 1st Order Expected Rayleigh resolution/nm | 2st Order Expected Rayleigh resolution (cut-off resolution)/nm | 3rd Order Expected Rayleigh resolution/nm |
|---|---|---|
| 122<br>61 (half pitch) | 61<br>30.5 (half pitch) | 40.6<br>20.3 (half pitch) |

For producing the t-FZP 11 a IBL machine was used which parameter are shown in table 3c:

TABLE 3c

IBL machine and machine parameters

| Machine | Current/pA | Drift correction | Dynamic reference process | Fabrication (Milling) time/h | Dwell time/μs | Number of cycles | Number of element loops | Step size/nm |
|---|---|---|---|---|---|---|---|---|
| ionLINE (Raith) | 50 | Yes, (between each cycle) | Yes, (every 10 drift correction | 15 | 1.4 | 100 | 5 | 10 |

In table 3d and table 3e the results for the resulting design and the resulting optical performance of the produced t-FZP 11 are listed

Figure 21:
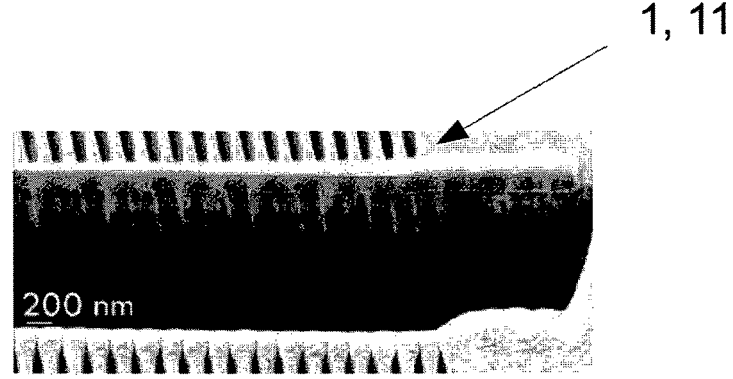
FIG. 21: the produced t-FZP with a slanted zone profile due to re-deposition and beam shape.
Figure 22:
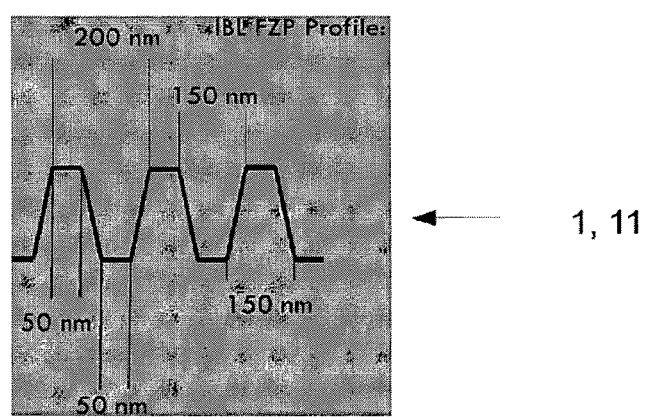
FIG. 22: a slanted zone profile due to re-deposition and beam shape corresponding to FIG. 21, FIG. 23: shows a design of a positive FZP (left) and a design of a FZP according to invention=positive FZP where $1^{st}$ zone is filled with material 2 (right)

TABLE 3d resulting design of the produced t-FZP 11
Deviation of profile from targeted profile Yes, slanted walls with angles from 6° in outermost zones to 4°-5° for innermost zones (see FIG. 21)

TABLE 3e optical performance of the produced t-FZP 11

| 1st Order measured resolution/nm | 1st Order Efficiency measured/% (at 900 eV) | 2nd order measured Resolution at 900 eV | 2nd Order measured Efficiency (at 900 eV) | 3rd Order measured resolution/nm at working energy: 900 eV |
|---|---|---|---|---|
| 115.6 (dependant on Energy, see other energy in next column) 57.8 (half pitch) | 9% | 60 nm<br>30 nm (half pitch) | 2.2% | 42 nm<br>21 nm (half pitch) |

Figure 23:
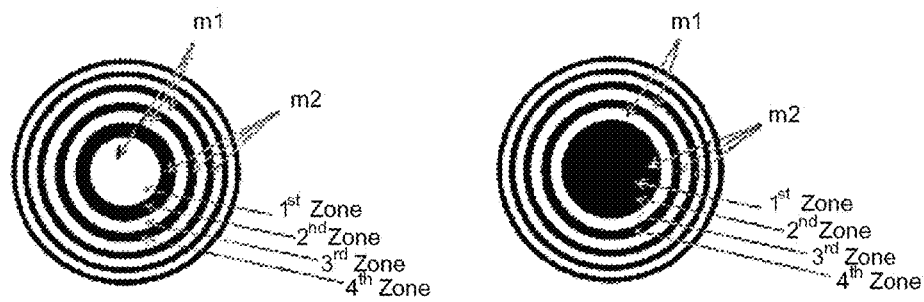

The position of the zones is determined by the standard FZP Formula Equation (1) calculated for a wave length of l=1.033 nm (Energy of 1200 eV) for a positive (inner most and outer most zones are empty) t-FZP 11, where the first zone has been filled with gold as the material of the layer 3 as shown in FIG. 23.

Image of the t-FZP 11 as manufactured are shown in FIG. 21 where an unconventional slanted profile of the zones are visible.

Figure 24:
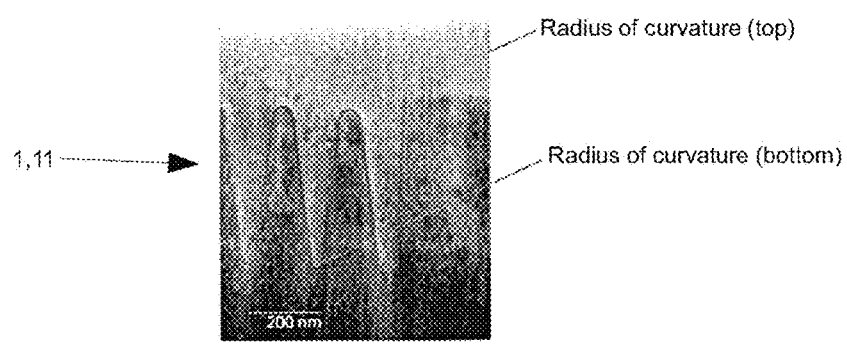
FIG. 24: a detail of FIG. 21 showing curvatures on top and on bottom of the zone.

Trapezoidal with slope as described on FIG. 8(3) were the angle a takes value of 6° for the outermost zones as shown in FIG. 21 and values of 4-5° for the innermost zones which are not represented. For the outermost zones: the top and bottom shape of the zone present a curvature as shown in FIGS. 21 and 24 with a radius of curvature of 77 and 35 nm respectively. A similar radius of curvature is observed for the inner zones but only on the edges of the trapezoid.

As the results in table 3d and table 3e show a high resolution with good efficiency (2%) can be achieved at second order of the t-FZP 11 and allows a doubling of the resolution compared with the first order resolution.

In the following tables 4a to 4 e parameters for producing the before described K-FZP 10 with IBL are given corresponding to the tables 3a to 3 e for producing the t-FZP 11 with IBL.

TABLE 4a design parameters of the K-FZP 10

| K-FZP Material | Working Energy/eV | Zone plate height/nm | f/μm (1st Order) | Number of periods | Diameter/μm | Outermost period width Λ/nm |
|---|---|---|---|---|---|---|
| Gold (sputtered) | 1500 | 500 | 7260 | 75 | 60 | 200 |

TABLE 4b targeted optical performance of the K-FZP 11

| 1st Order Expected Rayleigh resolution/nm | 1st Order Expected Sparrow resolution (cut-off resolution)/nm | 1st Order Efficiency/% (@ 1500 eV) | 3rd Order |
|---|---|---|---|
| 122 61 (half pitch) | 94 47 (half pitch) | 23 (4) | In ideal K-FZP: no higher degree of diffraction |

TABLE 4c

IBL machine and machine parameters for producing K-FZP 10

| Machine | Acceleration Voltage/keV | Current/pA | Drift correction | Fabrication (Milling) time/h | Dwell time/μs | Number of passes | Step size/nm |
|---|---|---|---|---|---|---|---|
| Nova Nano-Lab (FEI) | 30 keV | 30 pA | Yes, (every 120 s) | 3 | 3 | 1896 | 16 |

TABLE 4d resulting design of the produced K-FZP 11
Deviation of profile from targeted profile Yes, the profile of the K-FZP present a high roughness (see FIGS. 13 a to c)

TABLE 4e optical performance of the produced K-FZP 11

| 1st Order Sparrow resolution/nm at working energy: 1200 eV | 1st Order Efficiency/% (@1500 eV) |
|---|---|
| 115.7 57.8 (half pitch) | 5.4 |

Figure 25:
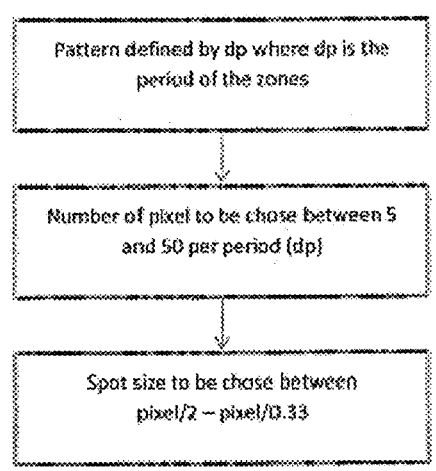
FIG. 25: schematically drawing of the control of the ion beam.

Regarding the control system a software is used to control the milling of the focused ion beam 7 in FIG. 25 the milling procedure due to the focused ion beam 7 is shown.

Thereby $d_p$ is the period of a zone of the zone plate, $\Lambda$ is the period of the outermost zone, pixel size is $\Lambda$ divided by the number of pixel, the overlap factor is pixel size divided by B wherein B is the beam size In the beginning it is to decide a number of pixels to best describe the structure. This number should be between 5 and 50 per period. Then decide the spot size by changing the current in a way that the overlap factor falls between 2 and 0.33.

Figure 26:
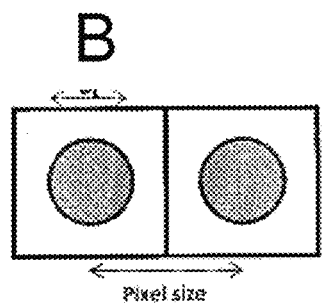
FIG. 26: relation between beam size D and pixel size

FIG. 26 shows relation between beam size B and pixel size.

FIG. 23 shows a design of a positive FZP 1, 10, 11 on the left side and a design of a FZP according to invention with a positive FZP 1, 10, 11 where 1st zone is filled with material on the right side. A first material m1 is shown in white, whereas a second material m2 is shown in black.

In FIGS. 27 and 28 the production of a FZP 1, 10, 11 is shown schematically. With an ion beam device 30 a focused ion beam 7 is generated. This focused ion beam 7 is accelerated with an acceleration voltage 34 through a beam defining aperture 31, a deflector 32 and a lens 33 onto a grounded carrier 41, on which a layer 3 is deposited on a surface 4 of a substrate 2. The layer 3 is deposited on the surface 4 of the substrate 2 by means of sputtered particles 37 which are generated by primary ions 36 which are accelerated onto a target 35, which is in this case an gold target 35 as shown in FIG. 28*b*. From this target 35 the sputtered particles 37 are sputtered onto the surface 4 of the substrate 2 and forms on that surface 4 the layer 3.

As especially shown in FIG. 28c the KFZ-plates 1, 10, 11 are formed on the layer 3 by means of a focused ion beam 7.

All the features disclosed in the application documents are claimed as being essential to the invention, insofar as they are novel either individually or in combination as compared with the prior art.

Figure 29:
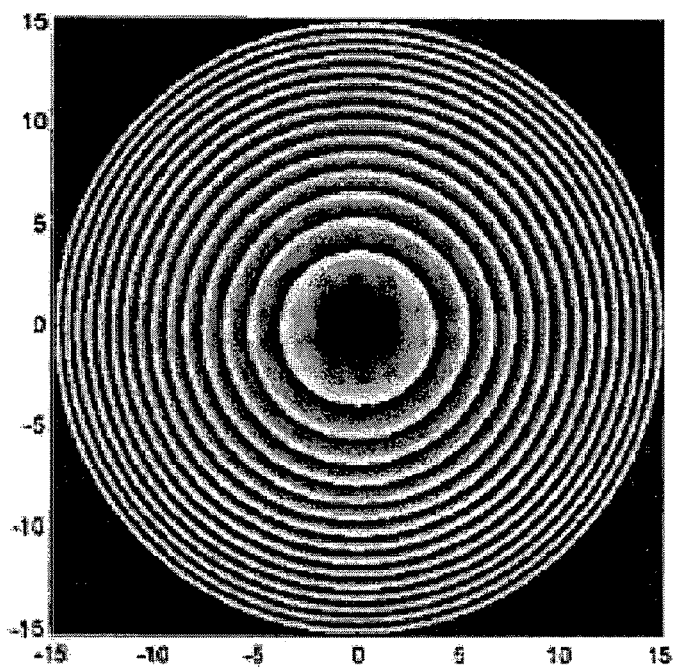
FIG. 29: SEM image of another K-FPZ for focusing high energy radiation in a top view
Figure 30:
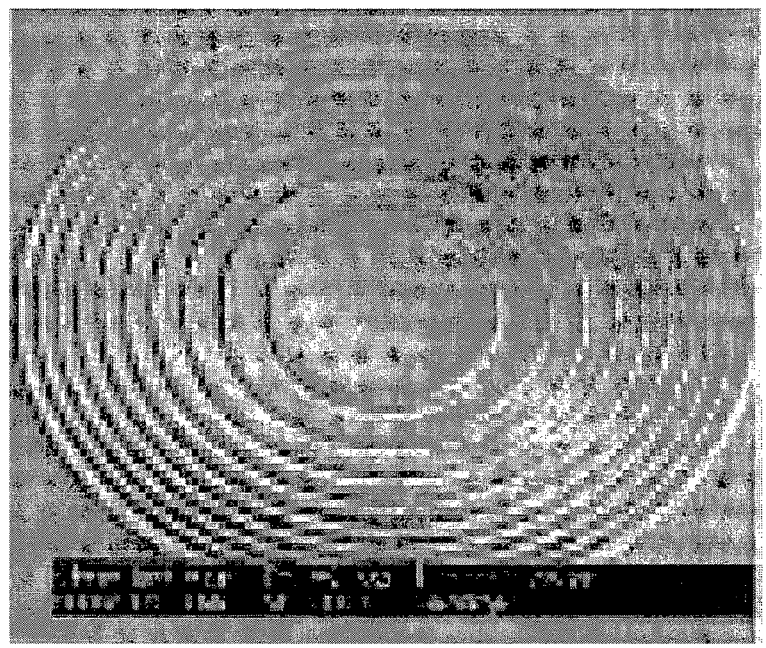
FIG. 30: SEM image of another K-FPZ for focusing high energy radiation in a perspective view.

The FIGS. 29 and 30 show different views of another K-FZP 10 which was produced for focusing high energy radiation. The K-FZP 10 of the FIGS. 29 and 30 has a diameter of 32 μm and a height of 800 nm and consist out of $Pd_{1-x}Si_x$ amorphous alloy.

LIST OF REFERENCE SIGNS

1 Fresnel Zone Plate (FZP)
2 substrate
3 layer
4 surface
5 three dimensional geometrical profile
6 dosage profile
7 ion beam
8 alignment mark
10 kinoform fresnel zone plate (K-FZP)
11 trapezoid fresnel zone plate (t-FZP)
12 place for FZP
15 sidewalls
30 ion beam device
31 beam defining aperture
32 deflector
33 lens
34 acceleration voltage
35 target
36 primary ions
37 sputtered particles
38 marker
39 transmission profile
40 k-FZP lens of the state of the art
41 carrier
d diameter of FZP, K-FZP, s-FZP
h height of FZP, K-FZP, s-FZP
W, Λ width of period
T thickness of a layer
r radius
h height of a zone,
b width of a zone,
b1 and b2 bottom and top width of a zone
α, α1, α2 angles
H Height
D Dose
m1 first material
m2 second material

The invention claimed is:

1. A method of producing a Fresnel zone plate for applications in high energy radiation comprising the steps:
   a) supplying a substrate transparent to high energy radiation;
   b) depositing a layer of a metal, a metal alloy or a metal compound on a planar surface of the substrate;
   c) milling a three dimensional geometrical profile with concentric zones into the layer with ion beam lithography by a focused ion beam;
   wherein the three dimensional geometrical profile is calculated with a mathematical model according to the equations $$t(r) = \text{Mod}\,[(r/F)^2, 1]$$

and $$F = B\sqrt{f/E}$$

where the Fresnel zone plate has a height and a radius where t(r) is the height of the Fresnel zone plate as a function of the radius r of the Fresnel zone plate, Mod is a modulo function where 1 is the dividend, F is a parameter in μm which depends on focal length f and on operating energy E of the Fresnel zone plate and on a constant B, and wherein a dosage profile for a focused ion beam of the ion beam lithography is set up inverse to the calculated three dimensional geometrical profile.

2. The method according to claim 1, wherein depositing the layer on the planar surface of the substrate comprises depositing the layer on the planar surface of the substrate until the layer has reached a thickness (T) between 50 nm and 4000 nm.

3. The method according to claim 1, wherein the constant B has a value between 45 and 55.

4. The method according to claim 1, wherein the dosage profile of the focused ion beam is given by the equation $$D = t \ast I/A$$

where D is the dosage profile, t is a dwell time, I is a focused ion beam current, and A is an area size of a pixel to be milled.

5. The method according to claim 4, wherein the dwell time t is at least 100 ns and at most 5 ms.

6. The method according to claim 4, wherein the focused ion beam current is between 1 pA and 100 pA.

7. The method according to claim 4, wherein the dwell time t is between 1 μs and 600 μs.

8. The method according to claim 4, wherein the focused ion beam current is between 10 pA and 70 pA.

9. The method according to claim 1, wherein milling the three dimensional geometric profile with concentric zones into the layer by the focused ion beam further comprises using a focused ion beam energy between 5 kV and 100 kV.

10. The method according to claim 1, wherein operating energy E of the produced Fresnel zone plate is between 50 eV and 90 keV.

11. The method according to claim 1, wherein milling the three dimensional geometrical profile with concentric zones into the layer by the focused ion beam further comprises milling the three dimensional geometrical profile with concentric zones into the layer by the focused ion beam for a time between 10 minutes and 36 hours.

12. The method according to claim 1, wherein milling the three dimensional geometrical profile with concentric zones into the layer by the focused ion beam further comprises milling the three dimensional geometrical profile into the layer by the focused ion beam for a time between 5 minutes and 30 minutes if no drift correction and no alignment marker is used.

13. The method according to claim 1, wherein milling the three dimensional geometrical profile with concentric zones into the layer by the focused ion beam further comprises milling the three dimensional geometrical profile with concentric zones into the layer by the focused ion beam using a step size of 5 nm to 200 nm.

14. The method according to claim 1, further comprising mounting the substrate on a holder or a carrier.

15. The method according to claim 1, wherein depositing the layer on the planar surface of the substrate further comprises depositing the layer on the planar surface of the substrate until the layer has reached a thickness (T) between 150 nm and 1000 nm.

16. The method according to claim 1, wherein milling the three dimensional geometrical profile with concentric zones into the layer by the focused ion beam further comprises using a focused ion beam energy between 10 kV and 50 kV.

17. The method according to claim 1, wherein milling the three dimensional geometrical profile with concentric zones into the layer by the focused ion beam further comprises milling the three dimensional geometrical profile with concentric zones into the layer for a time between 2 hours and 20 hours.

18. The method according to claim 1, wherein milling the three dimensional geometrical profile with concentric zones into the layer by the focused ion beam further comprises milling the three dimensional geometrical profile with concentric zones into the layer by the focused ion beam using a step size of 10 nm to 20 nm.

19. A method of producing a Fresnel zone plate for applications in high energy radiation comprising the steps:
 a) supplying a substrate transparent to high energy radiation;
 b) depositing a layer of a metal, a metal alloy or a metal compound on a planar surface of the substrate;
 c) milling a three dimensional geometrical profile with concentric zones into the layer with ion beam lithography by a focused ion beam; and
 d) using a drift correction for the focused ion beam,
 wherein the three dimensional geometrical profile is calculated with a mathematical model, and wherein a dosage profile for a focused ion beam of the ion beam lithography is set up inverse to the calculated three dimensional geometrical profile.

20. The method according to claim 19, wherein using the drift correction for the focused ion beam further comprises using an alignment marker on the layer.

21. A Fresnel zone plate, produced according to the method of claim 1, wherein the Fresnel zone plate comprises:
 a) a substrate transparent to high energy radiation;
 b) a layer of a metal, a metal alloy or a metal compound on a planar surface of the substrate;
 c) wherein the layer comprises a three dimensional geometrical profile with concentric zones milled into the layer with ion beam lithography by a focused ion beam; wherein the three dimensional geometrical profile is calculated with a mathematical model according to the equations $$t(r)=\text{Mod}\,[(r/F)^2,1]$$

and $$F=B\sqrt{f/E}$$

where the Fresnel zone plate has a height and a radius where t(r) is the height of the Fresnel zone plate as a function of the radius r of the Fresnel zone plate, Mod is a modulo function where 1 is the dividend, F is a parameter in μm which depends on focal length f and on operating energy E of the Fresnel zone plate and on a constant B,
 wherein the Fresnel zone plate has a diameter (d) between 20 μm and 500 μm,
 wherein the Fresnel zone plate is a t-FZP, and
 wherein the concentric zones comprise slanted sidewalls.

22. The Fresnel zone plate according to claim 21, wherein the Fresnel zone plate has a height (h) between 100 nm and 10 μm.

23. The Fresnel zone plate according to claim 22, wherein the concentric zones comprise an outermost period having a width (W) between 10 nm and 2000 nm.

24. The Frensel zone plate according to claim 22, wherein the concentric zones comprise an outermost period having a width (W) between 100 nm and 500 nm.

25. The Fresnel zone plate according to claim 21, wherein the concentric zones comprise a period number between 30 and 500.

26. The Fresnel zone plate according to claim 21, wherein the slanted sidewalls are slanted between 3° and 7°.

27. A Frensel zone plate produced according to the method of claim 1, wherein the Frensel zone plate comprises:
 a) a substrate transparent to high energy radiation;
 b) a layer of a metal, a metal alloy or a metal compound on a planar surface of the substrate;
 c) wherein the layer comprises a three dimensional geometrical profile with concentric zones milled into the layer with ion beam lithography by a focused ion beam; wherein the three dimensional geometrical profile is calculated with a mathematical model according to the equations $$t(r)=\text{Mod}\,[(r/F)^2,1]$$

and $$F=B\sqrt{f/E}$$

where the Fresnel zone plate has a height and a radius where t(r) is the height of the Fresnel zone plate as a function of the radius r of the Fresnel zone plate, Mod is a modulo function where 1 is the dividend, F is a parameter in μm which depends on focal length f and on operating energy E of the Fresnel zone plate and on a constant B,
 wherein the Fresnel zone plate has a diameter (d) between 40 μm and 150 μm and the concentric zones comprise a period number between 35 and 400, wherein a period contains one zone in cases of K-FZPs and wherein a period contains two zones in cases of t-FZPs.

28. The Frensel zone plate according to claim 27, wherein the Frensel zone plate has a height (h) between 200 nm and 700 nm.

* * * * *